United States Patent [19]

Mithal

[11] Patent Number: 5,115,987
[45] Date of Patent: May 26, 1992

[54] METHOD FOR SEPARATION OF BEVERAGE BOTTLE COMPONENTS

[76] Inventor: Ashish K. Mithal, Box #2023, University of Lowell, Lowell, Mass. 01854

[21] Appl. No.: 657,485

[22] Filed: Feb. 19, 1991

[51] Int. Cl.$^5$ ............................................. B02C 11/08
[52] U.S. Cl. ........................................ 241/23; 241/99; 209/2; 209/11; 209/12; 209/17; 209/173; 209/539; 209/930
[58] Field of Search ................... 209/11, 12, 17, 44.1, 209/173, 522, 539, 545, 629, 632, 634, 930, 934, 2; 83/54, DIG. 946; 241/DIG. 38, 23, 99

[56] References Cited

U.S. PATENT DOCUMENTS

| | | | |
|---|---|---|---|
| 3,814,240 | 6/1974 | Laundrie | 209/11 |
| 4,160,398 | 7/1979 | Bichot et al. | 83/54 X |
| 4,199,109 | 4/1980 | Watanabe | 209/11 X |
| 4,331,227 | 5/1982 | Risley | 209/934 X |
| 4,693,379 | 9/1987 | Stehle | 209/930 X |
| 4,832,205 | 5/1989 | Bacus | 209/539 X |

FOREIGN PATENT DOCUMENTS

| | | | |
|---|---|---|---|
| 2619025 | 2/1989 | France | 209/173 |
| 2198662 | 6/1988 | United Kingdom | 209/930 |

Primary Examiner—Donald T. Hajec
Assistant Examiner—Joseph A. Kaufman

[57] ABSTRACT

A method for separation of beverage bottle components including high density polyethylene (HDPE) basecup; poly ethylene terephthalate (PET) bottle body; aluminum cap; paper/plastic labels and adhesives, including disjoining, isolating and separating the various bottle components. The method essentially involves steps of: bisecting the bottles into two halves to disengage the cap from the bottle body; heating the bisected bottle halves so as to cause thermal softening of the adhesives; mechanically isolating the thermally loosened assemblage; subjecting the isolated components to a flotation tank; collecting the light (floating fraction) and heavy (sunk fraction) fractions separately; air classifying the light HDPE fraction to remove labels; separating the components of the heavy fraction (aluminum and PET) due to their size differential.

2 Claims, 2 Drawing Sheets

5,115,987

METHOD FOR SEPARATION OF BEVERAGE BOTTLE COMPONENTS

BACKGROUND OF THE INVENTION

1. Field of the Invention

This invention relates to a process of plastics waste sortation, and more particularly addresses separation of the multiple plastics and non-plastics constituents found in soda beverage bottles namely polyethylene (PE), polyethylene terephthalate (PET); Aluminum (Al), labels and adhesives.

2. Description of the Prior Art

The perennial garbage pile-up has emerged as one of the most frustrating national problems. And, plastics today are squarely at the very core of the current solid waste debate. A serious challenge confronts the U.S.: appropriate disposal of 320 billion lbs. of waste that pours annually into municipal solid waste streams to be buried, burned or less often recycled. Recycling, although not inexpensive in itself, can be less costly than other disposal methods because their is both a return on the reused material and an offset on the landfill charges. Moreover, increasing prices of virgin plastics, the limited reserves of natural resources such as petroleum, stringent environmental regulations and skyrocketing tipping fees have made recycling imperative as well as economically attractive.

Salvaging plastics from domestic waste poses quite a problem technically because of the heterogeneity of the wastes. The soda beverage bottle provides a classic recycling history. Most commercial PET bottle recovery processes currently employed, appear to be a version of the basic PET bottle recycling process embodied in the CPRR process (Center for Plastics Recycling Research at Rutgers University in Piscataway, N.J.).

PET beverage bottles are not one but several materials: a PET body (clear or green), a pigmented high density polyethylene (HDPE) base cup, aluminum (Al) cap, labels and adhesives. A typical method for separation of these components developed by CPRR (Ref.: Modern Plastics Supplement, "Waste Solutions", April 1990, p 32-35) is described hereinafter. In this process the bottles are shredded and ground into chips. The chips are then air classified to remove the light weight paper and other contaminants. To remove the labels still attached to the chips, the granulated mixture undergoes a detergent wash. Once the labels and adhesives are removed, the lighter HDPE fraction is separated from the heavier PET and aluminum pieces by flotation methods (some of the process technologies use a hydrocyclone system at this point). The HDPE chips are then dried and collected. PET and aluminum mixture goes on for final separation.

The PET and aluminum chips require further drying so that they can be electrostatically separated. This is the most expensive part of the process (Ref: Chemical and Engineering News, Jan. 30, 1989, p. 11).

These prior art processes suffer from several disadvantages which make then economically unattractive. Wet operations of necessity require large amounts of water. Intermediate drying steps to enhance the efficiency of PET/metal separation are costly. The electrostatic separation step for PET/Aluminum mixture is a major financial hurdle for economic reclamation of bottle constituents.

With the knowledge of the prior art and its shortcomings it can be readily inferred that there is a need for a beverage bottle recovery process, which:

(1) can economically separate the constituent plastics and non-plastics in a soda beverage bottle,
(2) does not require expensive electrostatic separation techniques for recovery of aluminum,
(3) does not involve multiple separation steps.

These needs are adequately satisfied by the process of the current invention.

BRIEF SUMMARY OF THE INVENTION

It is, therefore, an object of this invention to obviate the disadvantages of the prior art and provide an economic method for separating the constituents of beverage bottles.

The invention relates to means and methods for disjoining and separating the various components of beverage bottles. The process essentially consists of means for slicing the entire bottle longitudinally into two halves. This simple bisection disengages the cap from the bottle body. The bottle halves are then collected and transported on a conveyor. Means are provided to heat the bottle halves along their path of travel, whereupon exposure to heat softens the adhesives, which joint the HDPE base-cups and labels to the PET bottle body. The loosened assemblage of the base cup/bottle/cap is then gravity fed to a scrambler which effects disjunction of all the respective components of the beverage bottles. The components are then conveyed to a flotation chamber wherein the lower specific gravity of HDPE and labels causes them to float while the heavier densities of PET and aluminum cause them to sink. The HDPE/labels fraction is further purified by air classification or centrifuging. PET and aluminum can be readily separated by mechanical screening owing to a large size differential. In this way all the components of soda beverage bottles can be readily separated by a simple process.

DETAILED DESCRIPTION OF THE INVENTION

The present invention capitalizes on several key properties of the soda beverage bottles to achieve effective separation of the various constituent materials:

1. the size differential of the aluminum cap and the PET bottle body,
2. the low specific gravity of the HDPE base-cups and labels.
3. the low softening point of the hot melt adhesive used to attach labels and join the PET bottle body to the HDPE base-cup,
4. the tendency of the PET bottle body to shrink upon application of heat, due to thermal relaxation of the biaxial orientation imparted to it during its manufacture by the stretch blow molding process.

In essence the process consists of:

1. chopping the entire bottle longitudinally into two halves by suitable means, 2. subjecting, the chopped bottle halves to heat so as to cause softening of the adhesive used to attach base-cups and labels, 3. conveying the heated bottle halves and feeding them into a scrambler so as to mutually isolate the components of the beverage bottles, 4. feeding the disjoined components of the beverage bottles to a floatation tank, 5. removal of HDPE cups and labels from the top of the tank, 6. removal of PET and aluminum from the bottom of the tank, 7. separation of HDPE and labels by air classification or centrifuging, 8. separation of PET and aluminum by mechanical screening due to their size differential.

Figure 1:
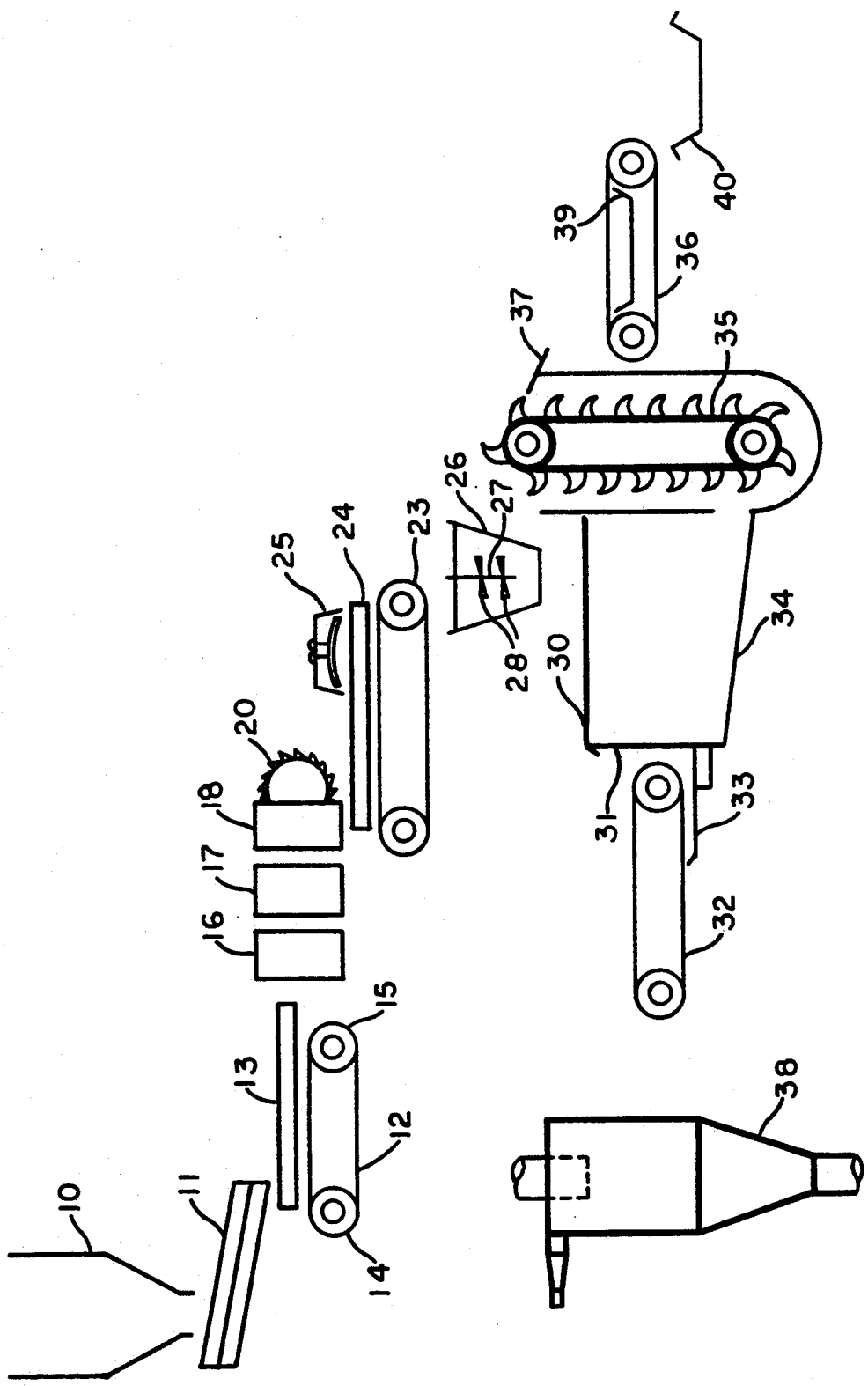
FIG. 1 is a schematic diagram showing an integrated system for separation of beverage bottles in accordance with the present invention.
Figure 2:
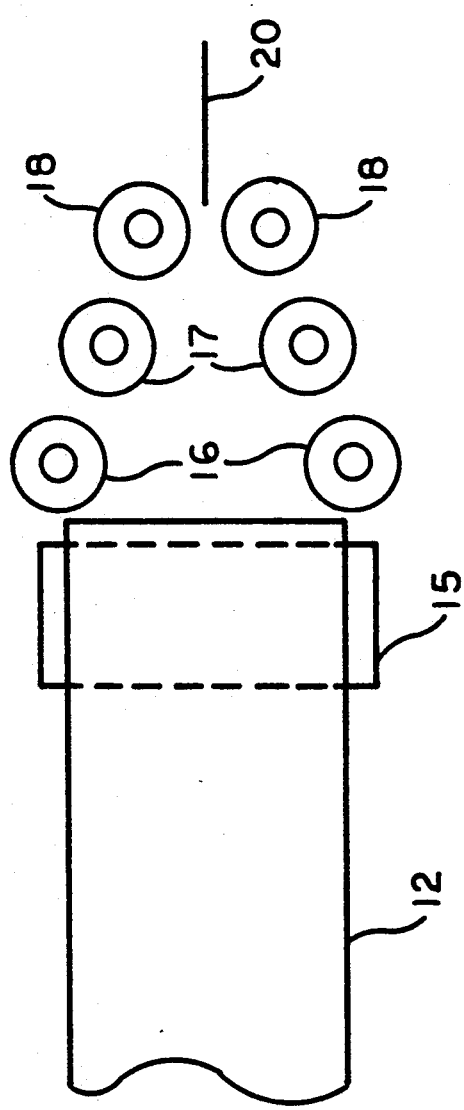
FIG. 2 is a top view of the longitudinal bottle cutter and feeding assemblage.

Many variations are possible to accomplish the separation of beverage bottle components by the process of the current invention. To expedite demonstration of the process involved a simple embodiment is described hereunder:

The process of the current invention requires preferably unmutilated bottles as the starting feedstock. Referring to FIG. 1 reference numeral 10 represents the feeding hopper for the beverage bottles. The bottles emerging from the bottom end of the hopper 10 fall upon an orientation device which orients the bottles along their longitudinal axes, here represented by a simple V-shaped chute 11. The longitudinally oriented bottles are gravitationally transferred onto conveyor 12. Appropriate guiding assemblies 13 in the form of shield walls are provided on each lateral edge of the conveyor 12 to preserve the longitudinal orientation of the bottles and to prevent spillage therefrom. The conveyor 12 is trained around rollers 14 and 15 rotating clockwise and driven by suitable means. The longitudinally oriented bottles travelling on conveyor 12 at the end of their path come under the influence of three vertical pair of rollers viz. 16, 17 and 18. The axes of roller pairs 16, 17 and 18 (refer to FIG. 2) are arranged in a convergent manner in the direction of travel of the bottles such that the roller pairs 16, 17 and 18 have a progressively diminishing nip opening. The convergent geometry of the roller pinch openings provides for a stepwise compression of a bottle sequentially from roller pair assembly 16 to 18. The longitudinally oriented bottles are fed one by one by roller assembles 16, 17 and 18 to the rotating knife 20 which bisects the bottles singly into two halves. The bisected bottles when released by the rollers 18 are collected onto a takeaway conveyor 21 trained around rollers 22 and 23 and rotating in a clockwise fashion. Shield walls 24 are provided on each lateral edge of the conveyor 21 to prevent spillage therefrom.

An infrared heater 26 is mounted at a suitable distance atop of conveyor 21. Along their path of travel on conveyor 21 the bottle halves pass underneath the heater unit 25 whereupon the application of heat causes softening of the adhesive joining the base-cups and labels to the PET bottle body. This thermal treatment loosens the base-cups and labels from the PET bottle, sufficiently so as to cause disjoinment. Moreover, biaxially oriented PET bottle body undergoes a thermal relaxation when exposed to heat and shrinks. Thermal shrinkage is an additional factor that aids in the disjunction of base-cups and labels from the PET bottle body. To further guarantee mutual isolation of the various bottles components the heated bottle halves on the conveyor 21 are gravitationally transferred into a scrambler 26 which provides the necessary mechanical action for the disengagement of the already loosened bottle components.

Scrambler 26 has a vertical shaft 27 with a series of rotating blades 28 disposed is a staggered manner widely spaced with a phase angle differential. The mechanical action of the scrambler blades knocks off labels, base-cups and caps from the PET bottle body and these four components are dropped into a flotation tank 30 for separation. The flotation tank 30 has a dual chamber construction with a shorter wall 31 to permit overflow of the lighter floating fraction(s) viz. base-cups and labels, onto takeaway conveyor 32. Water overflow over the wall 31 is contained by the baffle plate 33 and recirculated to the tank 30.

The heavier bottle components (PET and Al caps) collect at the bottom of the smaller chamber of the tank 30, where they are picked up by a bucket elevator 35 and delivered onto a perforated takeaway conveyor 36, through chute 37.

The lighter fraction consists of HDPE and labels is further separated by air classification unit 38. The heavier fraction containing PET and aluminum is separated by mechanical screening due to their size differential. Aluminum is collected in trough 39 and PET is collected in trough 40.

From the foregoing it becomes apparent that new and useful means and methods have been herein described for economic separation of beverage bottle components. It is of course understood, that, any such modifications, alterations and adaptations as may readily occur to those skilled in the art to which this invention pertains are intended within the spirit of the present invention which is limited only by the scope of the claim(s) appended hereto.

Accordingly what is claimed is:

1. A method for separation of components of beverage bottles, said components being high density polyethylene (HDPE) base-cup, polyethylene terephthalate (PET) bottle body, aluminum cap, labels and adhesives; said method comprising the steps of:
   a. transporting said beverage bottles from one location to a second location in a continuous path of travel,
   b. orienting said beverage bottles using an orientation device disposed at an intermediate location between said first and second locations, whereby said beverage bottles are longitudinally oriented in the direction of said path of travel,
   c. interposing cutting means in said path of travel proximate to said second location, whereupon said longitudinally oriented bottles are bisected into two halves,
   d. collecting said bisected bottle halves onto a moving takeaway conveyor,
   e. subjecting said bisected bottle halves on said moving takeaway conveyor to thermal treatment, thereby thermally softening said adhesives joining said beverage bottle components,
   f. feeding said thermally softened bottle components into a scrambler having agitating means, whereby said beverage bottle components are mutually isolated and disjoined from each other,
   g. transporting said disjoined components of said beverage bottles to a flotation tank, whereupon said labels and HDPE base-cups float while said PET and aluminum components sink,
   h. collecting said afloat and sunk fractions separately, i. subjecting said sunk fraction to mechanical screening, whereby said aluminum and PET components are separated,
j. subjecting said afloat fraction to air classification, whereby said labels are separated from said HDPE base-cups.

2. A method for separation of components of beverage bottles, said components being high density polyethylene (HDPE) base-cup, polyethylene terephthalate (PET) bottle body, aluminum cap, labels and adhesives; said method comprising the steps of:
   a. transporting said beverage bottles from one location to a second location in a continuous path of travel,
   b. orienting said beverage bottles using an orientation device disposed at an intermediate location between said first and second locations, whereby said beverage bottles are longitudinally oriented in the direction of said path of travel,
   c. interposing cutting means in said path of travel proximate to said second location, whereupon said longitudinally oriented bottles are bisected into two halves,
   d. collecting said bisected bottle halves onto a moving takeaway conveyor,
   e. subjecting said bisected bottle halves on said moving takeaway conveyor to thermal treatment, thereby thermally softening said beverage bottle components,
   f. transporting said disjoined components of said beverage bottles to a flotation tank, whereupon said labels and HDPE base-cups float while said PET and aluminum components sink,
   g. collecting said afloat and sunk fractions separately,
   h. subjecting said sunk fraction to mechanical screening, whereby said aluminum and PET components are separated,
   i. subjecting said afloat fraction to air classification, whereby said labels are separated from said HDPE base-cups.

* * * * *